J. A. HILLIKER.
FRUIT PACKAGE.
APPLICATION FILED NOV. 20, 1908.
937,805.
Patented Oct. 26, 1909.
5 SHEETS—SHEET 1.
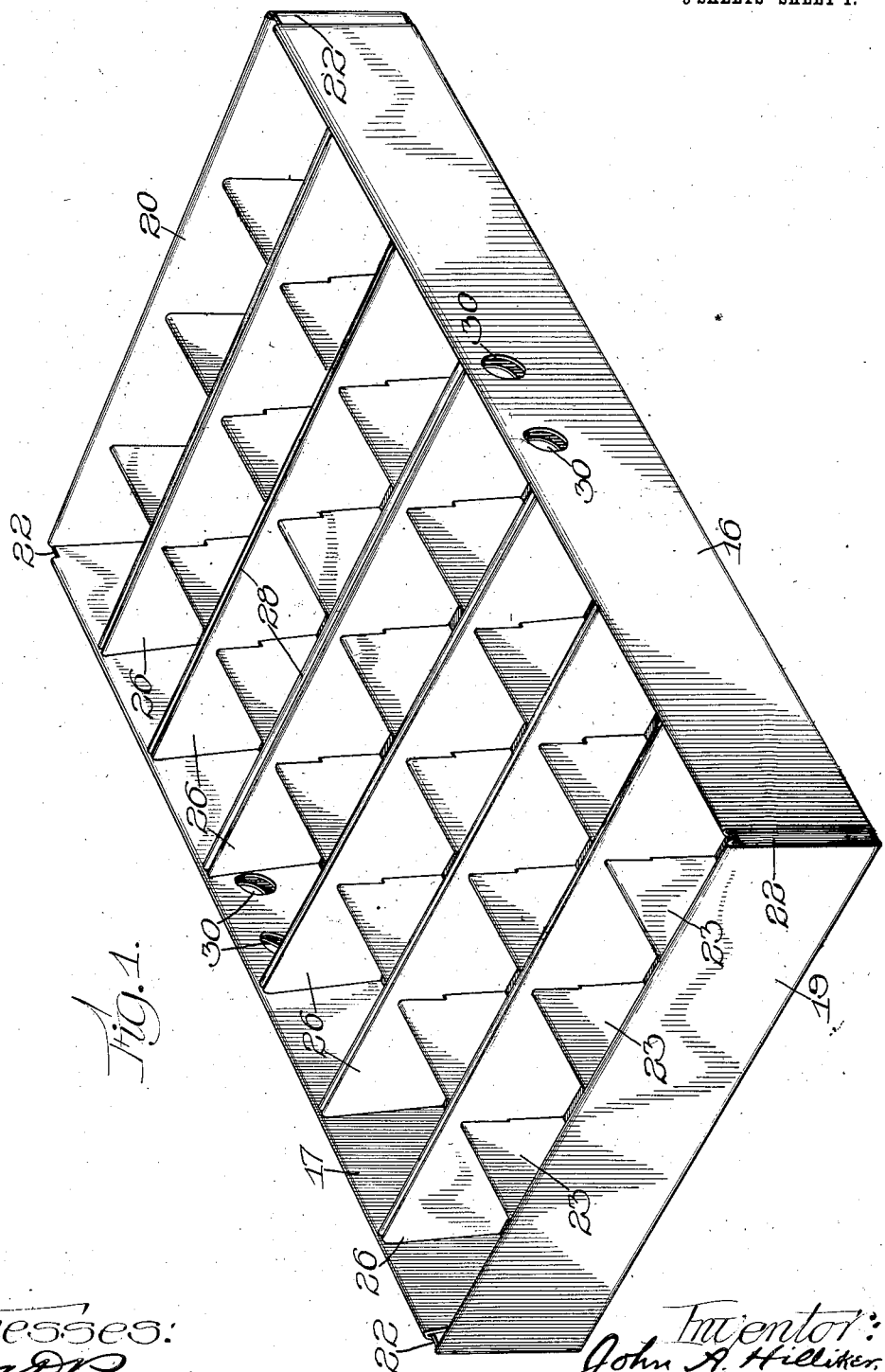

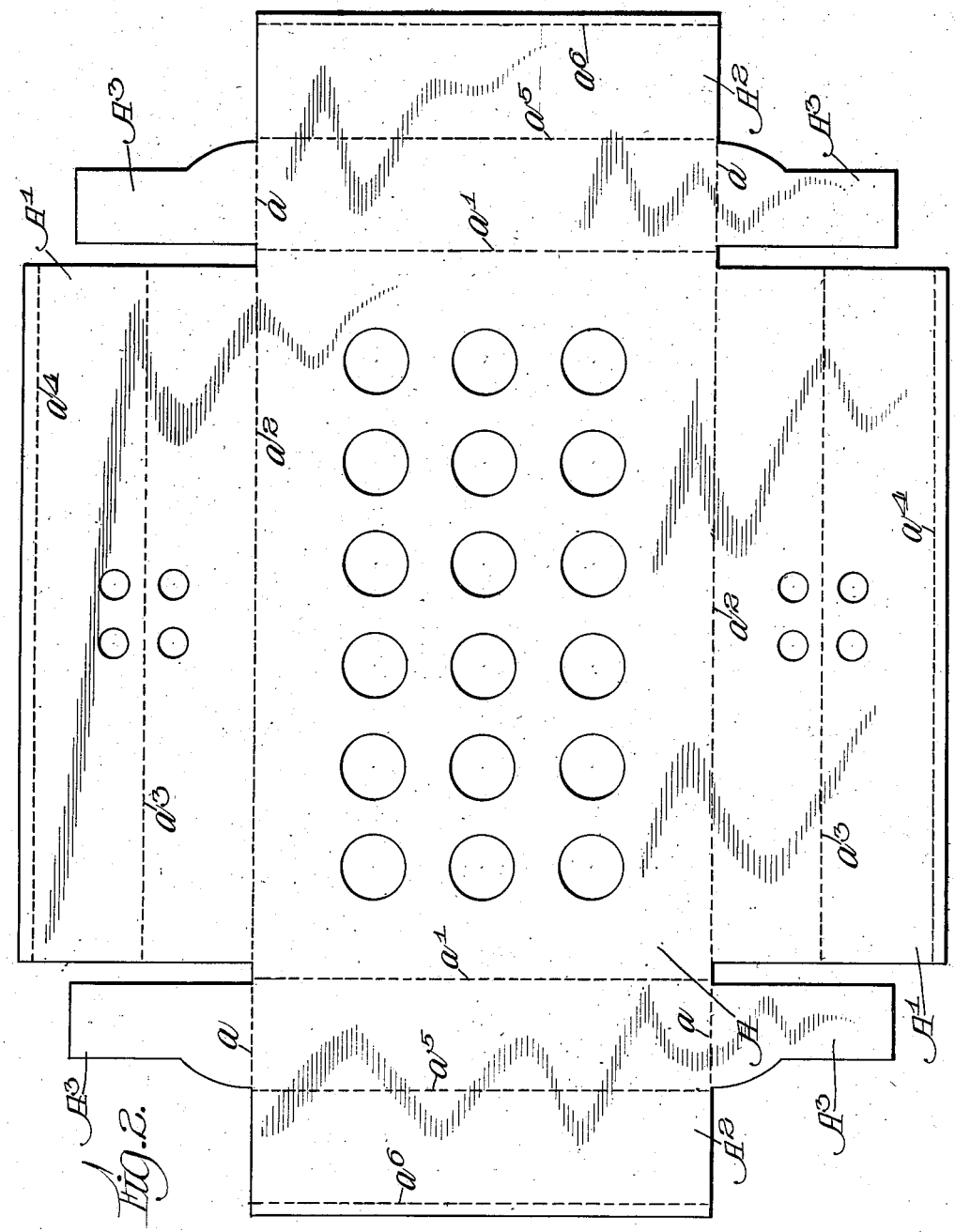

J. A. HILLIKER.
FRUIT PACKAGE.
APPLICATION FILED NOV. 20, 1908.
937,805.
Patented Oct. 26, 1909.
5 SHEETS—SHEET 3.
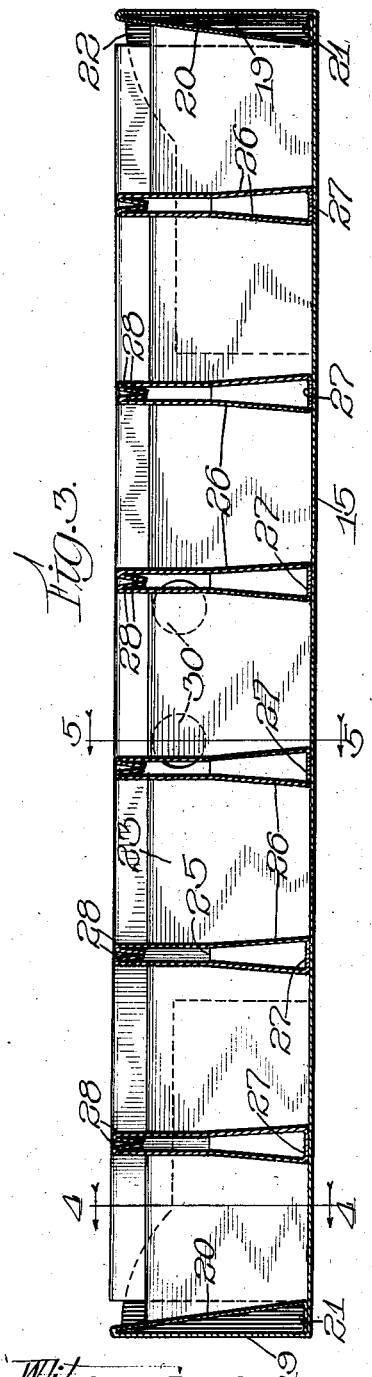
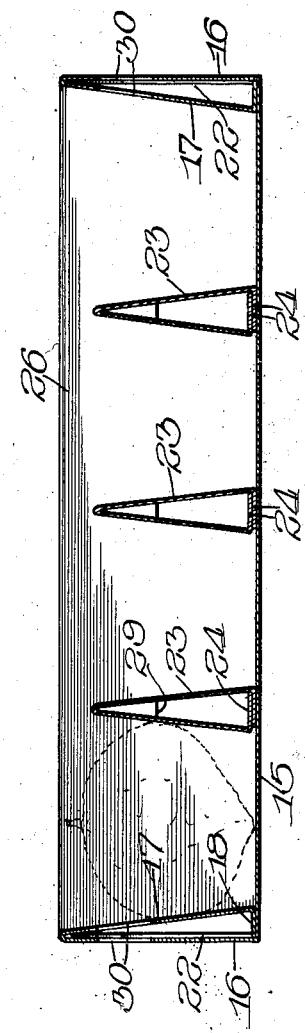
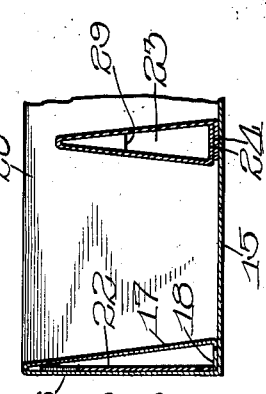

J. A. HILLIKER.
FRUIT PACKAGE.
APPLICATION FILED NOV. 20, 1908.
937,805.
Patented Oct. 26, 1909.
5 SHEETS—SHEET 4.
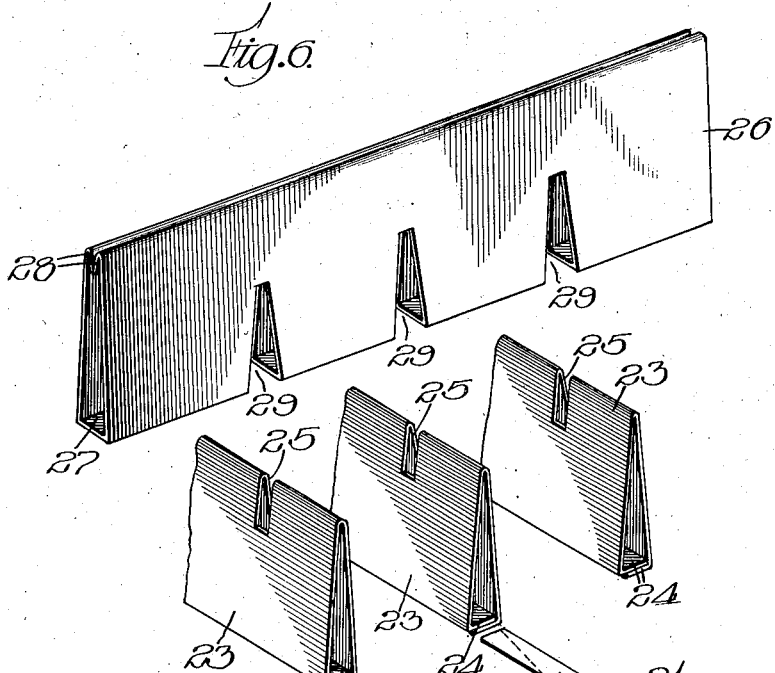
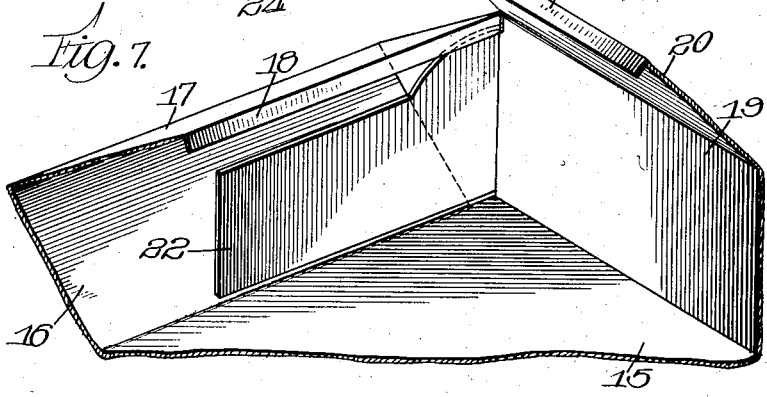
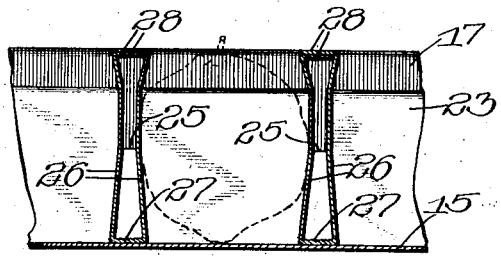

J. A. HILLIKER.
FRUIT PACKAGE.
APPLICATION FILED NOV. 20, 1908.
937,805.
Patented Oct. 26, 1909.
5 SHEETS—SHEET 5.
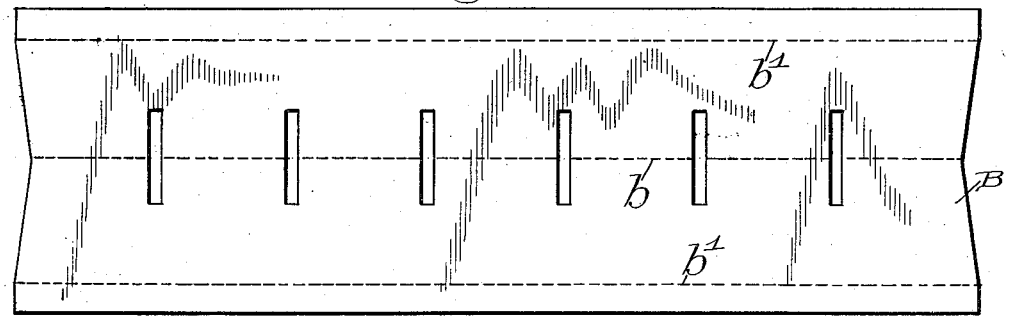
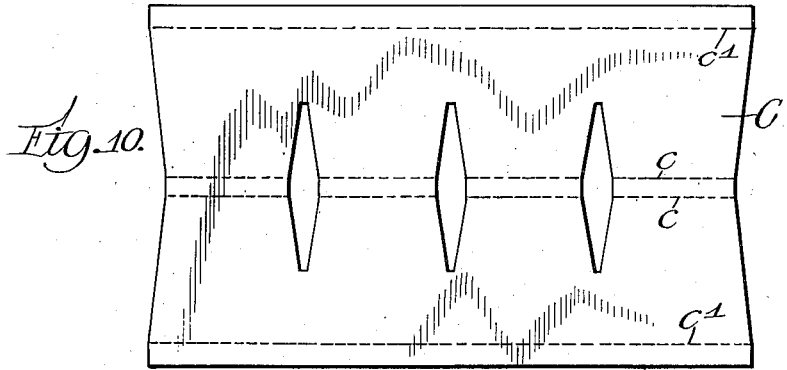
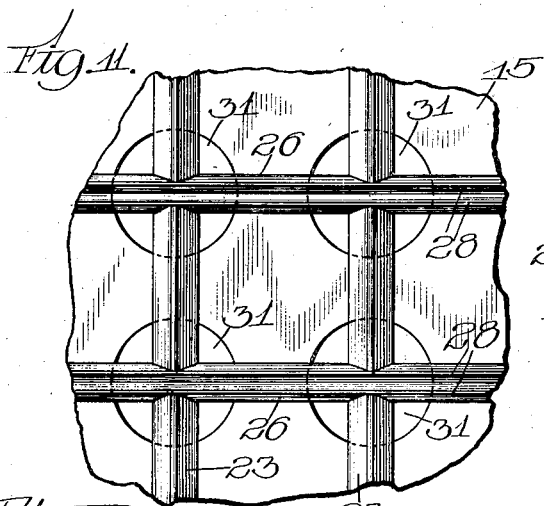
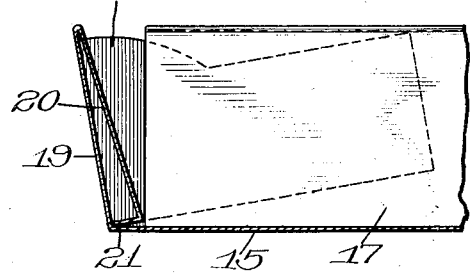

UNITED STATES PATENT OFFICE.

JOHN A. HILLIKER, OF CHICAGO, ILLINOIS, ASSIGNOR TO CUSHION CARTON MFG. CO., OF GRAND RAPIDS, MICHIGAN.

FRUIT-PACKAGE.

937,805.

Specification of Letters Patent. Patented Oct. 26, 1909.

Application filed November 20, 1908. Serial No. 463,637.

*To all whom it may concern:*

Be it known that I, JOHN A. HILLIKER, a citizen of the United States, residing at Chicago, in the county of Cook, in the State of Illinois, have invented certain new and useful Improvements in Fruit-Packages, of which the following is a specification, reference being had to the accompanying drawings.

In the packing and shipping of many kinds of small fruit, it is very desirable that the various pieces contained in a box or other package be kept entirely separate one from the other; for, where they are so packed as to be in contact, the fruit is frequently damaged in appearance by reason of the pieces rubbing against each other and oftentimes damaged also with respect to its soundness,—in either event causing a lessening of its market value.

It is the leading object of my invention to provide new and improved means for receiving and securely holding fruit designed to be packed in a shipping case, the holding means being adapted to keep each piece entirely separate from and out of contact with every other piece, and at the same time to so hold the fruit that if of average size and shape the several pieces of fruit will be yieldingly but firmly held so that none of the pieces will be damaged by rubbing or too forcible pressing against the said holding means.

It is also the object of my invention to improve in various details of construction packages designed for the general purpose above outlined.

I accomplish these objects by the construction and arrangement of parts hereinafter specifically described.

That which I believe to be new will be pointed out in the claims.

In the accompanying drawings:—Figure 1 is a perspective view of my improved device. Fig. 2 is a plan view of the blank from which the improved tray member is formed. Fig. 3 is a longitudinal central section through the tray member and the fruit-holding devices located therein. Fig. 4 is a vertical cross section at line 4—4 of Fig. 3, only one corner portion of the device being shown. Fig. 5 is a vertical cross section at line 5—5 of Fig. 3. Fig. 6 is a perspective view of three of the notched longitudinally-extending division walls and one of the notched cross-walls that extends across and connects with them,—the said cross-wall being shown raised out of position. Fig. 7 is a detail, being a perspective view of a corner portion of the tray member, showing the position of the parts when being put into position. Fig. 8 is a detail, being a vertical section through two of the division walls in place in the tray member and having their upper edges braced apart to more securely hold between them a piece of fruit, a piece of fruit being shown in position in dotted lines. Fig. 9 is a plan view of the blank from which a longitudinally-extending division-wall is formed, the lines upon which the blank is folded to produce the division-wall being represented by dotted lines. Fig. 10 is a similar view of the blank from which one of the cross-walls is formed. Fig. 11 is an enlarged detail, being a plan view of a portion of the tray with the two sets of interlocked division-walls located therein and showing the location of the ventilating openings in the bottom of the tray member. Fig. 12 is a detail, partly in section, of a portion of the tray member and representing, partly in dotted lines, the construction of the end tongues carried by each end wall of the tray member, which tongues are inclosed in and held by the double side walls of the tray member.

In the several figures of the drawings, in which corresponding parts are indicated by like reference characters, A (see Fig. 2) indicates the body of a blank having side wings A'—A' and end wings $A^2$—$A^2$, each of the end wings being provided with two lateral extensions $A^3$—$A^3$. From this blank a complete holding tray is formed, as clearly shown in the perspective view in Fig. 1. The tray is formed by first bending over the lateral extending pieces $A^3$ along their respective lines $a$ so that they stand at right angles to their respective wings $A^2$, and then bending up said wings $A^2$ along their respective lines $a'$ so that they stand substantially vertical. This last-mentioned turning will throw said extensions $A^3$ at each side of the blank so that they will be directed toward the extensions at the other side of the blank, all of said extensions $A^3$ then having their lower straight edges practically over the lines indicated by $a^2$. The end wings are then to be given a further turn along their lines $a^5$, and, as the distance from the line $a^5$ to the free edge of the wing $A^2$ is greater than the distance between the lines $a'$ and $a^5$, another bend is imparted to each of the wings $A^2$ along the lines $a^6$, thus forming a narrow inturned strip which will bear against the inner face of the outer portion of each double end wall of the tray, and these inturned narrow strips serve to hold the two members of each double wall apart. After the end walls are thus formed, the tray is completed by the formation of the side walls, which is done by bending each side wing $A'$ over on the lines $a^2$ and $a^3$ and bending it also near its free edge along the line $a^4$. In such turning, the extensions $A^3$, that form the tongues 22 of the completed device, are inclosed between the double side walls and such tongues are thereby held in place. The turning of each wing along the line $a^4$ forms a narrow inturned flange, the free edge of which bears against the inner face of the outer member of the side wall and serves to hold the inner and outer members of the side wall apart, as is clearly shown in the sectional views illustrating the completed device. It will be understood that in practice the lines of fold mentioned will best be indicated on the material in any suitable way at the time the blank is cut.

By folding the blank along the lines as described, there will be produced a tray whose bottom portion is of single thickness and is indicated by 15, and which is provided with double side and end walls, the two integral members of the side walls being indicated by 16 and 17, respectively, such walls being held apart by a narrow flange 18 formed by turning in the material of the blank along the line $a^4$. A similar double end wall construction for the tray is also formed by folding the blank as described, the integral outer and inner pieces of such end walls being indicated, respectively, by 19 and 20, and being held apart from each other by the narrow inturned flange 21 that is formed by bending the material along the lines $a^6$ of the blank.

The four extensions $A^3$ of the blank form locking tongues 22, which, as stated, lie between the inner and outer pieces 16 and 17 of the double side walls, and as these tongues 22 are integral with the end walls, the four walls are held connected together. Inasmuch as it is desirable to have the end walls permitted a slight amount of movement away from the side walls, I make the tongues for the greater portion of their length of somewhat less width than the width of the double side walls within which they are inclosed. This permits the end walls to be rocked outward along their lower edges until the upper edges of the tongues strike against the fold forming the upper edge of the side walls. This is of value at times in order to permit a piece of fruit of a little extra size to be packed in the outer end compartments of the carrier and generally to give a little more flexibility at the ends of the tray.

Resting upon the bottom of the tray and inclosed within the four double walls thereof are a series of division walls placed at right angles to each other and interlocked, thus forming cells or pockets each adapted to receive an individual piece of fruit. Each of the dividing strips is also of double construction, the two walls being held separated from each other. In Fig. 9 is shown a blank from which each longitudinally-extending strip is formed, the blank as a whole being indicated by B. In forming the strip, the blank is bent upon itself centrally along the line $b$ and a short distance from each edge it is also bent longitudinally along the lines $b'$—$b'$. So bending the blank produces a strip 23 having two walls that diverge from their upper edge and the lower edges of which are held apart by one of the short inturned flanges 24 that are formed by bending in the blank along the lines $b'$. In the upper edge of each of these strips 23 is formed a series of notches 25 that are formed by the slits shown as cut in the blank in Fig. 9.

In Fig. 10 is represented a blank indicated by C, and from a blank of this kind is formed each one of a series of cross strips, which, when interlocked as shown in Fig. 1, with the longitudinally-extending strips 23, will form a series of cells or pockets, each adapted to contain a single specimen of fruit. These cross-strips are formed by folding over the blank along two parallel lines $c$—$c$, each a short distance from one side of the longitudinal center of the blank, and also bending the blank along the lines $c'$—$c'$, a short distance from each edge of the blank. Such bending produces a double-wall cross strip 26, having a flat integral base portion 27, due to bending the blank along the two lines $c$—$c$. The upper edge of each of these cross-strips has a flange turned inwardly and downwardly, said flanges being indicated by 28 and lying in contact with each other. Each of these strips 26 is provided in its lower portion with a series of notches 29 formed by slotting the blank of Fig. 10, as shown in said figure. The notching of these strips 26 enables them to be removably interlocked with the other strips in the well-known manner common in egg-carriers and similar devices employing division strips of single thickness.

I have referred to strips 23 as being longitudinally-extending strips, and the strips 26 as being cross-strips, but these are merely so designated for convenience; for it will of course be understood that the strips might be reversed so that the strips 26 would extend longitudinally of the tray while the others extended across from side to side, or that the tray might be of equal size in both directions instead of being longer in one direction than the other as indicated. Any suitable number of strips of both kinds will be employed, to suit the size of tray, and the strips will be of such size and cut so as to lie closer to or farther from each other according to the size and character of the fruit intended to be packed in the cells or pockets formed.

30 indicates holes through the double side walls by means of which a person can lift the tray and its contained load of fruit into or out of the shipping box or crate in connection with which the device is intended to be used.

In practice, I contemplate placing a plurality of fruit laden carriers, such as shown in Fig. 1, in a suitable shipping box or crate, one loaded tray above another, and when so used it is desirable that ample provision for ventilating the various layers of fruit be provided, and to that end I form in the bottom 15 of each tray a series of openings 31 for that purpose, the openings, as clearly shown in Fig. 11, being so arranged that the points of intersection of the various strips come over the centers of these openings, and hence each cell or pocket has a ventilating opening at each lower corner. These ventilating holes of course will be formed at the time that the blank for the tray is cut.

With the parts arranged as shown in Fig. 1, a package is provided well adapted for containing and transporting small fruits of various kinds with the minimum amount of danger to such fruits; because between each specimen of the fruit and every other specimen there is interposed two thicknesses of material; and as such material will be formed of strawboard or a similar substance, there will necessarily be a considerable amount of yield or springiness inherent in the material that will permit each piece of fruit to be fitted tightly and firmly within its respective pocket or cell and yet not pressed upon by the walls with sufficient pressure to mar the appearance of the fruit or cause an unsound spot or spots to develop therein. As shown in both forms of strips, the two walls of each strip are held farther apart along their lower edges than at their upper edges, such holding apart in the strips 23 being by the inturned flanges 24 and in the strips 26 by the integral narrow base 27. By reason of this it is found that when pieces of fruit of substantially uniform size and of a size to be snugly entered into the respective cells or pockets at the top are placed in such cells or pockets that they cannot well escape through the lower ends of the cells or pockets even if the interlocking cross-strips with the fruit held by them be lifted out of the tray. If after the cells or pockets have been each filled with a specimen of fruit it is desired to contract the mouths of the cells or pockets so as to possibly hold the fruit a little more firmly in place, the inturned flanges 28 of the strips 26 can be turned up as indicated in Fig. 8, so that they will lie substantially horizontal and one of them act as a spreader to keep the upper edges of the two walls of the strips 26 farther apart. Ordinarily, however, it is found that leaving the flanges 28 turned down as indicated in Fig. 6 is satisfactory, as the pieces of fruit will be held firmly enough without causing a spreading apart of the upper edges of the walls. I have called attention to the fact that the division walls will be made of strawboard or similar material possessing the quality of yielding or springiness to a certain extent under pressure, and the tray member will also be formed of similar material.

The tray member by itself is not herein claimed, but will form the subject-matter of a separate application.

What I claim as my invention and desire to secure by Letters Patent is:—

1. A fruit-holding package having double walls, the two members of each double wall being held spaced apart at one edge by means formed integral with one of said members.

2. A fruit-holding package comprising a series of interlocked strips whereby cells or pockets are formed, each of said strips consisting of two members spaced a distance apart, the spacing means projecting from the edge of one member toward the opposite member.

3. A fruit-holding package comprising a series of interlocked strips whereby cells or pockets are formed, each of said strips consisting of a single piece of material folded longitudinally upon itself to produce two wall members, said members being spaced apart by means projecting from the free edge of one of the members.

4. A fruit-holding package comprising a series of interlocked strips whereby cells or pockets are formed, each of said strips consisting of a single piece of material folded longitudinally upon itself to produce two members, one of said members having its edge turned to form a flange directed toward the other member.

5. A fruit-holding package comprising a series of interlocked strips whereby cells or pockets are formed, each of said strips consisting of a single piece of material folded longitudinally upon itself to produce two members spaced a distance apart and each strip having a flat base portion.

6. In a fruit-holding package, the combination with a tray having an integral bottom and walls, each of said walls having an inner and an outer member spaced apart, of a series of interlocked strips whereby cells or pockets are formed, each of said strips consisting of a single piece of material folded upon itself to produce two members spaced apart.

7. In a fruit-holding package, the combination with a tray having an integral bottom and walls, each of said walls having an inner and an outer member spaced apart, of a series of interlocked strips whereby cells or pockets are formed, each of said strips consisting of a single piece of material folded upon itself to produce two members spaced apart, the first tray-bottom having openings beneath the intersections of the said interlocked strips.

8. A fruit-holding package comprising in combination two series of interlocked strips at right angles to each other, each strip of one series being formed of a single piece of material folded longitudinally upon itself and having one of its edges turned toward the opposite wall member.

9. A fruit-holding package comprising in combination two series of interlocked strips at right angles to each other, each strip of one series being formed of a single piece of material folded longitudinally upon itself and having its edges turned inward toward each other.

10. A fruit-holding package comprising a series of interlocked strips whereby cells or pockets are formed, each of said strips consisting of two wall members spaced apart, the free edges of said wall members being turned inward.

JOHN A. HILLIKER.

Witnesses:
 HUGH M. STERLING,
 G. L. BEELER.